May 15, 1923.
T. D. YENSEN
MAGNETIZABLE METER VANE
Filed June 9, 1919
1,454,878
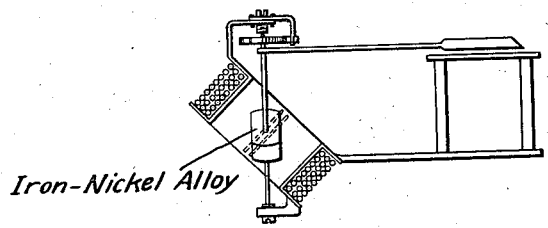
Iron-Nickel Alloy
WITNESSES:
H.T. Shelhamer
W.W. Woodman.
INVENTOR
Trygve D. Yensen
BY
ATTORNEY Patented May 15, 1923.

1,454,878

UNITED STATES PATENT OFFICE.

TRYGVE D. YENSEN, OF SWISSVALE, PENNSYLVANIA, ASSIGNOR TO WESTINGHOUSE ELECTRIC & MANUFACTURING COMPANY, A CORPORATION OF PENNSYLVANIA.

MAGNETIZABLE METER VANE.

Application filed June 9, 1919. Serial No. 302,703.

*To all whom it may concern:*

Be it known that I, TRYGVE D. YENSEN, a citizen of the United States, and a resident of Swissvale, in the county of Allegheny and State of Pennsylvania, have invented a new and useful Improvement in Magnetizable Meter Vanes, of which the following is a specification.

My invention relates to magnetizable materials or alloys and more particularly to alloys suitable for employment in the manufacture of vanes for electrical meters, the primary object of my invention residing in the provision of an alloy for this purpose which shall insure the greatest possible accuracy of meters in which it is employed.

Electrical meters, such as voltmeters and ammeters, generally employ a permanent magnet with a movable current-carrying coil arranged between the pole pieces. Such meters are comparatively expensive, both on account of the magnet and on account of the delicate bearings and connections to the movable coil.

Efforts have, therefore, been made by manufacturers of such meters to reverse the arrangement, namely, by having the coil stationary and attaching the indicating needle to a movable member or vane. If this element is made like a permanent magnet, the meter will read consistently, providing the current in the solenoid is always in the same direction, and errors will be extremely small. If, on the other hand, the current passing through the coil is reversed from time to time, which is the case with many meters of this character, the magnetism of the magnet varies with the reversals so that the meter readings are very much in error. Such meters are, therefore, useless for conditions where the direction of current is reversed.

The object of my invention consists in providing a magnetizable material which may be employed as a movable element or vane of meters, of the above character, with satisfactory results.

I have found that the ideal material for such instruments would be one in which the magnetism, corresponding to a certain magnetizing force, is always the same, no matter what has been the previous history of the material. In other words, the material should have zero retentivity and coercive force and consequently, zero hysteresis. One material which, for obvious reasons, cannot be used but which meets these conditions, is air. An additional requirement is, therefore, that the material should be ferro-magnetic. Ordinary silicon steel has been used for this purpose but even this has too high a hysteresis loss to keep the errors within the desired limits.

I have now ascertained that the desired characteristics are, to a great extent, inherent in certain iron-nickel alloys, and tests with such alloys, in a well known meter of standard type, have shown the error, under the most severe conditions, to be less than 2% and, under normal conditions, less than 1%. On the other hand, in the same meter, provided with its original vane, the corresponding errors were from 6% to 4%. It will, therefore, be noted that the new material affords 100% improvement over the material at present used.

My improved magnetizable alloy for the manufacture of meter vanes comprises an alloy of iron and nickel to which may be added a small amount, as, for example, 1 to 2%, of manganese, to make the alloy forgible. The proportions of iron and nickel may vary to a considerable extent but the nickel content should exceed 25% and should preferably be between 30% and 70%. The best results have been obtained with a 50% alloy made forgibly with a small amount of manganese. The alloy may be made in any suitable manner, and the vanes may be manufactured from it by any means desired, such as that employed in making the silicon steel vanes. After the vanes have been formed, they should be annealed in vacuo at about 900° C. and slowly cooled.

While the retentivity of vanes made from alloys ranging from 35% to 50% nickel is practically the same in all instances, the coercive force for the 50% alloy is about two-thirds of that for the 35% and the hysteresis loss is less than one-half. The permeability, too, is very much in favor of the 50% alloy.

It is very evident, therefore, that the retentivity element is not the determining factor and that the desired characteristic is rather a function of the three quantities, permeability, retentivity and coercive force. As the hysteresis loss of the material is a function of these same quantities, it may be taken as a measure of the desirability of iron-nickel alloys for this purpose. The hysteresis loss of my improved alloy is very low, being less than 1000 ergs per cubic centimeter per cycle for B=10,000 gausses.

The drawing shows an electrical meter having a vane formed of my improved alloy. From the foregoing, it will be apparent that I have provided a magnetizable alloy particularly adapted for employment in the manufacture of vanes for electrical meters and that a considerable variation in the proportions of the ingredients employed may be resorted to. I, therefore, reserve the right to make any changes in the proportions falling within the bounds set forth and to also utilize the material for any purposes for which it may be adapted. In fact, my invention is to be limited only as indicated in the claims.

I claim as my invention:

1. A meter vane formed of a magnetizable ferrous alloy consisting of over 25% nickel and having a hysteresis loss less than 1000 ergs per cubic centimeter per cycle for B=10,000 gausses.

2. A meter vane formed of a magnetizable alloy consisting of substantially 30 to 70% nickel and 70 to 30% iron.

3. A meter vane formed of a magnetizable alloy consisting of substantially 35 to 70% nickel and 65 to 30% iron.

4. A meter vane formed of a magnetizable alloy consisting of substantially 40 to 70% nickel and 60 to 30% iron.

5. A meter vane formed of a magnetizable alloy consisting of substantially 45 to 70% nickel and 55 to 30% iron.

6. A meter vane formed of a magnetizable alloy consisting of substantially equal parts of nickel and iron.

7. A meter vane formed of a magnetizable alloy consisting of substantially equal parts of nickel and iron together with a small amount of a third metal rendering the alloy forgible.

8. A meter vane formed of an alloy consisting of substantially equal parts of iron and nickel together with 1 to 2% of manganese.

In testimony whereof, I have hereunto subscribed my name this 29th day of May, 1919.

TRYGVE D. YENSEN.